US012526483B2

(12) United States Patent
Couleaud

(10) Patent No.: US 12,526,483 B2
(45) Date of Patent: Jan. 13, 2026

(54) METHODS AND SYSTEMS FOR PRODUCING COMMENTARY

(71) Applicant: Adeia Guides Inc., San Jose, CA (US)

(72) Inventor: Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 35 days.

(21) Appl. No.: 18/203,989

(22) Filed: May 31, 2023

(65) Prior Publication Data
US 2024/0406509 A1 Dec. 5, 2024

(51) Int. Cl.
*H04N 21/475* (2011.01)
*G10L 13/027* (2013.01)
*H04N 21/478* (2011.01)
*H04N 21/485* (2011.01)

(52) U.S. Cl.
CPC ....... *H04N 21/4755* (2013.01); *G10L 13/027* (2013.01); *H04N 21/478* (2013.01); *H04N 21/4852* (2013.01)

(58) Field of Classification Search
CPC ............. H04N 21/4755; H04N 21/478; H04N 21/4852; G10L 13/027
See application file for complete search history.

(56) References Cited

U.S. PATENT DOCUMENTS 9,535,879 B2 * 1/2017 Allen ................... G06F 40/289
9,704,020 B2 7/2017 Koul et al.
2006/0058103 A1 * 3/2006 Danieli .................. A63F 13/87 463/42
2016/0134714 A1 * 5/2016 Ono ..................... H04L 51/043 709/205
2020/0410982 A1 * 12/2020 Liu ......................... G10L 13/08
2021/0258656 A1 * 8/2021 Ceresoli .............. H04N 21/233
2022/0038790 A1 * 2/2022 Duan ............. H04N 21/234336
2022/0392428 A1 * 12/2022 Fernandez Guajardo .................. G06Q 50/01
2023/0018555 A1 * 1/2023 Chandrashekar .. H04N 21/4884

OTHER PUBLICATIONS

"Harry Caray leads 'Field Of Dreams' crowd in rendition of 'Take Me Out To The Ballgame', MLB on FOX,", YouTube [retrieved from https://www.youtube.com/watch?v=ykApKeT8IUo] (1 page).
Heaven, D., "AI sports commentator knows all the best stories," [retrieved from URL: https://www.newscientist.com/article/mg21628856-300-ai-sports-commentator-knows-all-the-best-stories/] (5 pages) (2012).
Kahn, J., "IMB Trials A.I. That Can Do Soccer Commentary," [retrieved from URL: https://fortune.com/2019/12/09/ibm-a-i-sports-commentary/] (9 pages).

* cited by examiner

*Primary Examiner* — Gigi L Dubasky
(74) *Attorney, Agent, or Firm* — HALEY GUILIANO LLP

(57) ABSTRACT

Systems and methods are described for producing customized commentary. Data relating to a competition activity is received. Information relating to at least one event occurring during the competition activity is inferred by processing the data using an artificial intelligence model. The information relating to at least one event is processed using a virtual persona model to generate customized commentary. The customized commentary is output.

20 Claims, 10 Drawing Sheets

METHODS AND SYSTEMS FOR PRODUCING COMMENTARY

BACKGROUND

The present disclosure relates to methods and systems for producing commentary. Particularly, but not exclusively, the present disclosure relates to producing commentary for a competitive activity, such as a sporting activity.

SUMMARY

Sports commentary has historically been performed by sports casters commentating on live sporting events. With an increase in online live streaming facilities, where independent live streamers provide their own commentary on live events, viewers are often now opting to select a commentator with a tone, mood and personality that is more to their preference to listen to while watching a sporting activity. This may cause an increase in energy consumption, as typically the user will listen to the commentary on an additional device, such as a smart phone, while watching the sporting event on a television. A need therefore exists to reduce the likelihood that a user will seek commentary from an additional source.

Systems and methods are provided herein for providing customized commentary of a competition activity. For example, the customized commentary may be tailored to a particular user, such that each of several users can enjoy distinct commentary tailored specifically to their interests or preferences. For example, by generating commentary output which is customized, e.g., based on user preferences, the appeal of the commentary may be increased for a user, and the user may therefore utilize the provided commentary, rather than opting for an alternative commentary from another source. The customized commentary may be generated using a virtual persona model. For example, by providing commentary output in a particular voice, delivery style, tone, idiolect, or personality, which may be selected by or for a user (e.g., based on user preferences, which may be explicitly provided by a user or inferred based on user activity, user demographics, activity of other users sharing one or more demographics of the user, etc.), the commentary may be more appropriate for, or appealing to, a particular user. In a further example, by providing a plurality of commentary outputs, for example each representing a different voice or personality, or each commentary output corresponding to a particular side, or team, of the competition event, the user's viewing experience may be further improved, as the interaction between the commentary outputs may be more engaging for a user.

According to the systems and methods described herein, data relating to a competition activity is received using control circuitry. For example, the competition may be a sporting activity, a video game, an e-sports game, or a board game, such as a chess match. The data may be image data, audio data, and/or motion data. The data may originate from a plurality of sources, such as from a plurality of cameras viewing the competition activity from different viewpoints. The data may be a video stream of a video game. The data may be data used to generate a video stream for a video game. The data may be raw data relating to the competition activity, or may be processed data, which provides information about the competition activity. The data may be captured data, such as captured or generated audio, images, video, and so on. Information relating to an event occurring during the competition activity is inferred by processing the data relating to the competition activity using an artificial intelligence model (using control circuitry). The information relating to the event may be inferred from the data, for example, information relating to an event may be determined which is not specified by the data (e.g., is not specified explicitly). The artificial intelligence model may utilize computer vision processes. For avoidance of doubt, a computer vision process may interpret and analyze data, for example, image data, video data, audio data, and so on, to recognize objects, detect patterns, and make decisions. The data may be processed using means other than the computer vision process, such as deep learning or a trained model. An event may be an incident such as an action performed during the competition activity, such as in soccer, passing the ball from one player to another player. An event may equally be an incident such as a pause in proceedings occurring during the competition event, such as half-time. The information relating to the at least one event may be information directly relating to the event (e.g. the event may be an action such as a pass of a ball), or may be an extrapolation of the event, such as a predicted subsequent action, or a tactic determined based on an event (e.g. where the at least one event comprises a series of passes). The information relating to the at least one event is processed using a virtual persona model comprising a voice synthesis module to generate customized commentary. The virtual persona model may correspond to the persona of a person such as a celebrity or sports caster. The voice synthesis module may be configured to mimic the sound of the persona on which the virtual persona model is based. The customized commentary may be customized for a user, for example, for a particular user and based on user preferences. The commentary output may be customized for a broadcaster. For example, a broadcaster may select preferences for the commentary output. The customized commentary is then output. For example, the customized commentary may be broadcast alongside a live stream of the competition activity.

In some examples, the voice synthesis module of the virtual persona model generates customized commentary comprising at least one of a voice, a delivery style, a tone, pronunciation and an idiolect corresponding to the persona on which the virtual persona model is based. For example, the virtual persona model may be a trained model used to directly or indirectly process the information relating to at least one event to generate customized commentary, where the trained model has been trained to generate commentary corresponding to a particular person. The virtual persona model may be trained to generate commentary having any of a particular voice, delivery style, tone, pronunciation, idiolect and/or personality which corresponds to a particular persona.

In some examples, the virtual persona model further comprises a personality module configured to generate customized commentary comprising supplementary commentary corresponding to a persona on which the virtual persona model is based. For example, the personality module may be configured to generate commentary based on a personality corresponding to a persona, for example, by the use of particular phrases or supplementary information (e.g. ancillary information). In an example, by using a virtual persona model, the customized commentary mimics the voice, delivery style, tone, idiolect, and/or personality of a particular sports caster, or celebrity, so that the customized commentary appears to have been spoken by that sports caster or celebrity.

In some examples, the virtual persona model may be selected by a user. A user may prefer a particular person, such as a particular sports caster, to provide commentary, and may select a virtual persona model according to their preference. For example, a user may be presented with a plurality of commentators from which they may select a (their preferred) commentator, each commentator having a different virtual persona model. In some examples, the virtual persona model may be selected by a broadcaster. For example, a broadcaster may select a particular virtual persona model for commentating alongside a live stream of a competition activity. The broadcaster may select a virtual persona model for a particular user based on data regarding the user. The virtual persona model may be set based on data regarding the user, for example, the interests, age, demographic, and/or gender of the user. The commentary may be produced to generally appeal to persons corresponding to data of the user, such as persons having the same interests. In some examples, the customized commentary is based on user preferences. For example, the user may have a preferred celebrity who they would like to commentate on competition activities, where a virtual persona model corresponding to that celebrity may be used to generate the commentary. In an example, a commentator is suggested or recommended to a user (e.g., based on user interests relating to a preferred sport, a preferred team, a preferred time-period or era, and commentators associated with those preferences). A user may selected a suggested commentator.

In some examples, the information relating to an event is processed to generate an incident script comprising at least one currently occurring incident corresponding to the event using vocabulary corresponding to the competition activity. For example, the information relating to the event may be processed to generate an incident script comprising a description of incidents occurring during the competition activity. The vocabulary used for different types of competition activity may differ, where the incident script may use vocabulary to describe the current competition activity which is relevant to that competition activity. An incident may be an action, such as a current action, or a non-action, such as a pause in proceedings. In some examples, the incident script comprises at least one prediction relating to the event. For example, the incident script may comprise at least one of a predicted action, a predicted tactic, a predicted outcome, a (predicted) time to a subsequent action. The incident script may be used as input, directly or indirectly, to the virtual persona model.

In some examples, the information relating to an event occurring during the competition activity comprises a current action. For example, in soccer, a current action may be a player dribbling the ball towards the opposing team's goal. In some examples, the information relating to an event occurring during the competition activity comprises a predicted action. For example, in soccer, a predicted action may be a prediction that a player will pass the ball to a different player, or may shoot at the goal of the opposing team. In some examples, the information relating to an event occurring during the competition activity comprises a predicted tactic. For example, in soccer, a predicted tactic may comprise a likely combination of passes between players in order to progress the ball towards the opponent's goal. In some examples, the information relating to an event occurring during the competition activity comprises a predicted outcome. For example, in soccer, a predicted outcome may be that a player will score a goal, for example based on an understanding of the likelihood that the player will have an opportunity to shoot at the goal of the opponent. In some examples, the information relating to an event occurring during the competition activity comprises a time to a subsequent action. For example, the time to a subsequent action may be the time to a player passing the ball to another player. In some examples, the information relating to an event occurring during the competition activity comprises a predicted urgency factor. The predicted urgency factor may relate to any of the current action, predicted action, predicted tactic, predicted outcome, or time to a subsequent action. For example, some actions or likely actions may indicate that the commentary should be produced to convey a level of excitement correlating with an event occurring in the competition activity. For example, where a player is likely to score a goal, there may be a high urgency factor, whereas a goal kick may have a low urgency factor.

In some examples, the information relating to the event is processed to determine whether ancillary information related to or unrelated to the competition activity is to be incorporated into the customized commentary, and where it is determined that ancillary information is to be incorporated, incorporating the ancillary information. For example, it may be determined whether the game play is slow paced, so a user's experience would be improved by incorporating information that the user may find interesting, which may or may not relate directly to the competition activity. For example, the ancillary information may be information on a particular player of a team, for example, statistics on the number of times a player has scored in a current league. The ancillary information may equally be information unrelated to the competition activity, such as current events, or the weather. The ancillary information to be incorporated may be based on the virtual persona model. For example, the virtual persona model may indicate ancillary information which may be included into the customized commentary when it is determined that ancillary information is to be included. The content of the ancillary information may be based on the type of information which the commentator (on which the virtual persona model is based) would discuss. The way in which the ancillary information is presented may be based on the idiolect of the commentator (e.g. using the type of phrasing and speech patterns that the commentator would use), and may incorporate commentary relating to topics that the commentator on whom the virtual persona model is based would discuss. The ancillary information may be incorporated into the commentary output when the predicted urgency factor is low. For example, where a ball is out of play, ancillary information such as commentary on an event occurring in popular culture may be incorporated into the customized commentary, for example to maintain the user's interest while no exciting action is occurring. The ancillary information may be incorporated when a particular event is occurring, such as half time.

In some examples, the ancillary information comprises information relating to the competition activity or another competition activity. For example, the ancillary information may relate to another competition activity which is being played at the same time as the competition activity. The ancillary information may relate to competition activities of supported teams of the user. In some examples, the ancillary information comprises information relating to a player of the competition activity. In some examples, the ancillary information comprises information relating to current events. In some examples, the ancillary information comprises information relating to interests of a user. For example, the information may be based on data or metadata relating to a user, such as a celebrity that the user follows, a TV show the user is currently watching. In some examples, the ancillary information comprises an advertisement or advertising content. For example, the advertisement may be customized, or personalized, for a particular user, or for a particular demographic of user. The advertisement may be based on data or metadata regarding the user, such as the user's shopping habits or food preferences. In some examples, the ancillary information comprises information on a competition activity (the current competition activity or another competition activity) in which the user has an interest. For example, the ancillary information may comprise information on a competition activity on which the user has placed a bet.

In some examples, the customized commentary is output in the form of audio output or is a transcript. For example, the commentary output may be intended to be listened to by a user, or may be used so that a commentator (for example, a celebrity) may read the transcript (e.g. which may have been created by incorporating their own mannerisms and personality) in order that they are able to speak knowledgeably about a competition activity with which they may not be familiar.

In some examples, the customized commentary is produced to incorporate commentary which is reactionary to a secondary customized commentary, wherein the second customized commentary is generated using a second virtual persona model. For example, the customized commentary may be in the style of a first commentator (e.g. corresponding to a first virtual persona model), and the second customized commentary may be in the style of a second commentator (e.g. corresponding to a second virtual persona model). Alternatively, the secondary customized commentary may be generated using the same virtual persona model as the customized commentary. The customized commentary and the second customized commentary may effectively provide a dialogue between the first commentator and the second commentator. The customized commentary may be produced to react to a plurality of customized commentaries. For example, the commentary provided by the plurality of customized commentaries may be a dialogue generated using a plurality of different virtual persona models. In some examples, each of a plurality of virtual persona model may be assigned a role (e.g., different roles). For example, a first virtual persona model may be assigned a primary or play-by-play role (e.g., wherein the first virtual persona model describes the game or event as it occurs), and the second virtual persona model may be assigned a secondary or color commentary role (e.g., wherein the second commentator provides content when a play is not in progress by, e.g., commenting on strategy or tactics, providing an analysis of the current event, providing information about the teams, players, or leagues, providing anecdotes or jokes, etc.).

In some examples, information relating to at least one event occurring during a competition activity is processed to produce secondary customized commentary, wherein the customized commentary and the second customized commentary relate to different events. The second customized commentary may be generated using a second virtual persona model. For example, the customized commentary may be produced to provide commentary on a first set of events, and the second customized commentary may be produced to provide commentary on a second set of events. For example, the customized commentary may relate to the actions of one team, where the second customized commentary may relate to the actions of an opposing team. Thus, the commentary may be presented by different virtual personas for each team. The customized commentary may be produced to provide commentary directly relating to actions of the players of the competition activity (for example, describing what is happening during the competition event), where the second customized commentary may provide commentary comprising ancillary information related or unrelated to the actions of the players (for example, discussing current events). A plurality of customized commentaries may be produced. Each of the customized commentaries may be generated using a different virtual persona model.

In some examples, it is determined if a question has been received from a user, and where a question (e.g. a question relating to the competition activity) has been received from a user, a response to the question is included in the commentary output. For example, the user may ask a question relating to a player of the competition activity, where the commentary output may then comprise a response to the question. In some examples, the commentary output may comprise a summary of the progress of the competition activity over a particular time period. For example, where a user has left the room in which the competition activity is being presented, when they return, they may request a summary of the action that they missed. The commentary output may include the requested summary. In an example, where it is detected that a user is no longer listening to the customized commentary (e.g., where the user has left the room), the output of the customized commentary may be paused until it is determined that the user intends to listen to the customized commentary (e.g. where the user re-enters the room). The customized commentary may then continue, and may incorporate a summary of the events that the user has missed.

In some examples, the inferring of the information relating to the at least one event occurring during the competition activity is performed using a first trained model. For example, information relating to an event occurring during the competition activity may be inferred by a first trained model based on data relating to a competition activity. In some examples, the processing is performed using a second trained model trained to provide output corresponding to a virtual persona. For example, commentary output may be produced by a second trained model (which is trained to output commentary corresponding to a particular person) based the information relating to an event occurring during the competition activity (inferred by the first trained model). The second trained model may be trained to produce commentary corresponding to a virtual persona. For example, the second trained model may be trained to mimic the sound, speech patterns and personality of a particular commentator defined by the virtual persona, and/or to incorporate ancillary information into the commentary. In some examples, both the inferring of the information relating to the at least one event occurring during the competition activity and the processing of the information relating to the at least one event are performed using the same trained model.

According to the systems and methods described herein, a model is trained for outputting information relating to at least one event. Training data is input to a learning model, the training data comprising data relating to a competition activity, and event descriptions of the data corresponding to each of a current action, a subsequent action, a subsequent tactic, time to a subsequent action, a subsequent outcome. The learning model is trained to output information relating to the at least one event comprising event descriptions based on an input comprising data relating to a competition activity.

According to the systems and methods described herein, a model is trained for outputting customized commentary. Training data is input to a learning model, the training data comprising information relating to the at least one event, and commentary corresponding to the event. The commentary may relate to a particular person and/or may comprise, or indicate where to incorporate, ancillary information. The learning model is trained to produce commentary based on an input comprising information relating to at least one event.

According to the systems and methods described herein, using data relating to a competition activity, first commentary output corresponding to a first virtual persona model is produced, second commentary output corresponding to a second virtual persona model is produced, and wherein the first commentary output and the second commentary output in combination provide a dialogue.

According to the systems and methods described herein, information relating to an event occurring during a competition activity is inferred (using control circuitry) based on data relating to the competition activity.

According to the systems and methods described herein, commentary output is produced (using control circuitry) based on inferred information relating to an event occurring during a competition activity, wherein the commentary output is customized.

According to the systems and methods described herein, commentary output corresponding to a competition activity is produced which corresponds to a virtual persona model.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
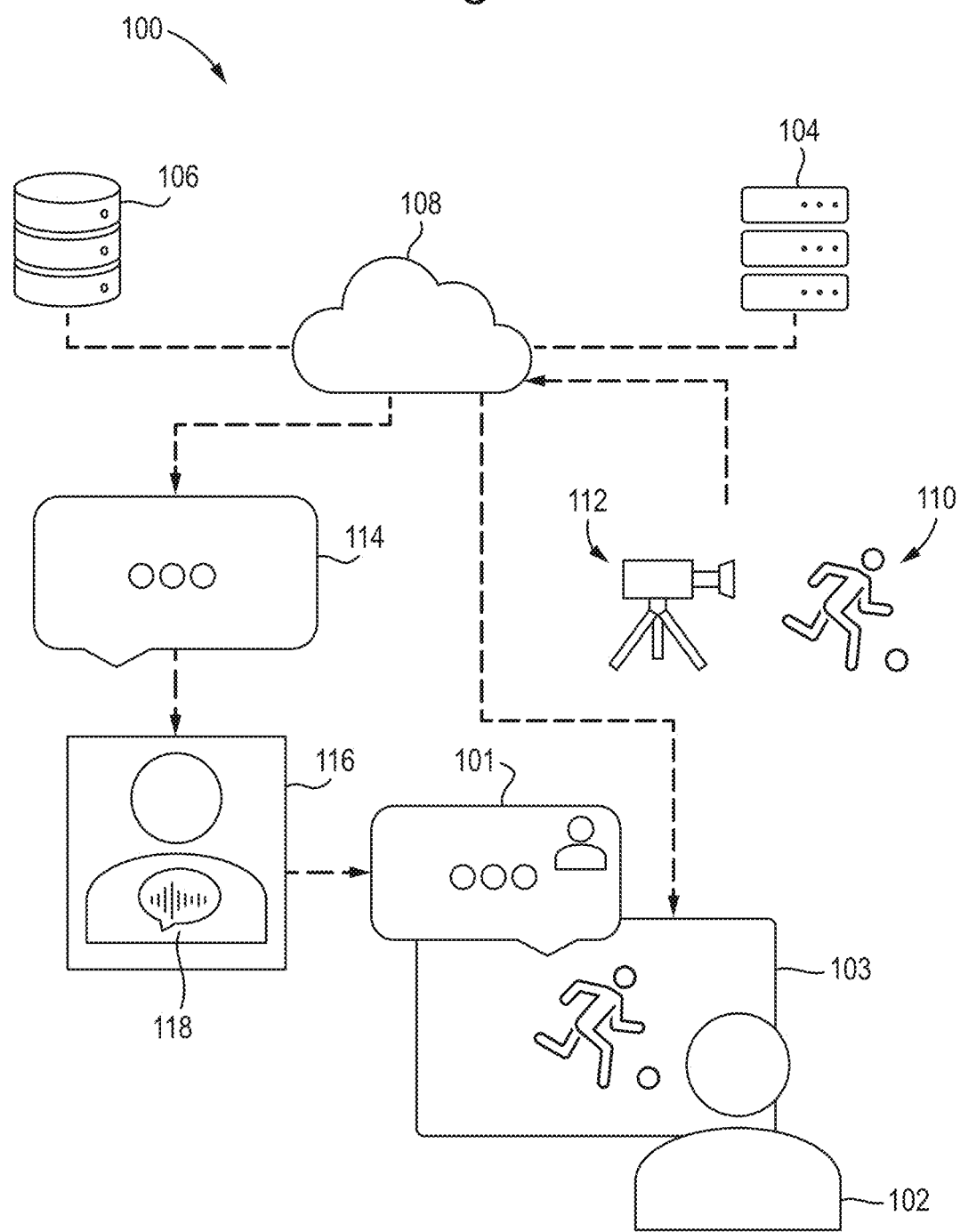
FIG. 1A illustrates an overview of the system for generating customized commentary, in accordance with some examples of the disclosure.

FIG. 1A illustrates an overview of a system 100 for generating commentary, for example, generating customized commentary 101. In particular, the example shown in FIG. 1A illustrates a user 102 viewing a competition activity on a display of a user device 103, for example, a television, which is communicatively coupled to a server 104 and a content item database 106, e.g., via network 108. In this example, data (e.g. visual data, audio data, footage, RADAR, LiDAR) of the competition activity 110 (in this example, a sporting activity) is captured by a video capture device 112 which in this example is a camera (in other examples, the data may be captured using any of or any combination of sensors such as an imaging device, an audio capturing device, a RADAR sensor, a LiDAR sensor, or any other sensor). In this manner, data relating to a competition activity 110 may be sent to the server 104 for processing, where the server 104 may send to the user device 103 a video stream of the competition activity, and where the user device 103 may display the video stream for the user 102 to view.

In some examples, the user device is a device such as a television, a smart phone, a laptop, a computer, a projected display, a virtual display (e.g. for use with extended reality (XR) device, or any display which may allow the user to view a competition activity. As referred to herein, the phrases "user equipment device," "user equipment," "user device," "computing device," "electronic device," "electronic equipment," "media equipment device," or "media device" should be understood to mean any device for viewing the competition activity, such as a television, a Smart TV, a streaming media device, a personal computer (PC), a laptop computer, a tablet computer, a personal computer television (PC/TV), a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the data relating to a competition activity 110 may be captured by an optical imaging device, such as a camera, by LiDAR, Radar, infrared sensors, audio capturing sensors, motion sensors, or any other suitable type of sensor. In some examples, the data may be a data stream corresponding to gameplay of a video game. For example, the data may be image data of gameplay of the video game, such as that displayed to the player, or may be data which can be used to generate image data to be displayed to the player of the video game. In some examples, the server 104 may be a server of a service provider who provides media content (such as the competition activity) for displaying on user devices.

The data relating to the competition activity 110 may be further processed to infer information 114 relating to an event occurring during the competition activity 110 based on the data. The information 114 relating to the event may be inferred by processing the data using an artificial intelligence model. For example, an artificial intelligence model may process the data in order to infer the location of players or sports equipment, actions performed by players, likely actions and tactics, a time to a subsequent action, and an urgency factor. Thus, the data may be processed to infer incidents occurring and/or likely to occur during the competition activity 110. In an example, the information 114 relating to the event may be a description of an event occurring during the competition activity 110 (e.g., the data may be processed to generate descriptions of events occurring or likely to occur in the competition activity 110). For example, in a game of soccer, the event may be that the ball has been passed from one player to another player. The information 114 relating to the event may be processed to generate an incident script, for example, a description such as "Player X passes the ball to player Y". The information relating to the event may comprise an indication of the urgency with which the information should be conveyed to the user 102, for example, where a player is likely to score a goal, an urgency factor indicating a high level of urgency may be included in the information 114 relating to the event.

In this example, the information 114 relating to the event is processed (e.g. at the server 104, or at the user device 103, or at a further device or server) using a virtual persona model 116 to produce customized commentary 101. The virtual persona model 116 may process the information 114 to generate commentary having any of a particular voice, delivery style, tone, idiolect, and/or personality. The virtual persona model 116 may correspond to a virtual persona, a virtual persona being a virtual representation of a persona of, for example, a particular person such as a celebrity. For example, the virtual persona model 116 may process the information 114 relating to the event to output commentary which imitates the voice, delivery style, tone, idiolect, and/or personality of a particular person such as a celebrity. The virtual persona model 116 may have been trained to mimic the speech of a particular person based on recordings of the person, for example, recordings of the person commentating on competition activities. Alternatively, the virtual persona model 116 may be based on an artificial persona, for example, trained using a plurality of actual persons, so that the artificial persona does not correspond to one particular persona.

In this example, the virtual persona model 116 comprises a voice synthesis module 118 which is used to generate customized commentary 101. The voice synthesis module may apply a particular voice, tone, and pronunciation corresponding to the virtual persona. In a further example, the virtual persona model 116 may further comprise a personality module. The personality module may apply a delivery style, vocabulary, and grammar corresponding to the virtual persona.

In an example, the user may select a virtual persona model 116 from among a plurality of virtual persona models. For example, the user may interact with a media guide or a media guidance application in order to select a virtual persona model 116, or may interact with an interface such as an interface on a smart phone (or the user device 103) in order to select a virtual persona model 116. In a further example, the virtual persona model 116 may be selected by the broadcaster of the competition activity.

Figure 1B:
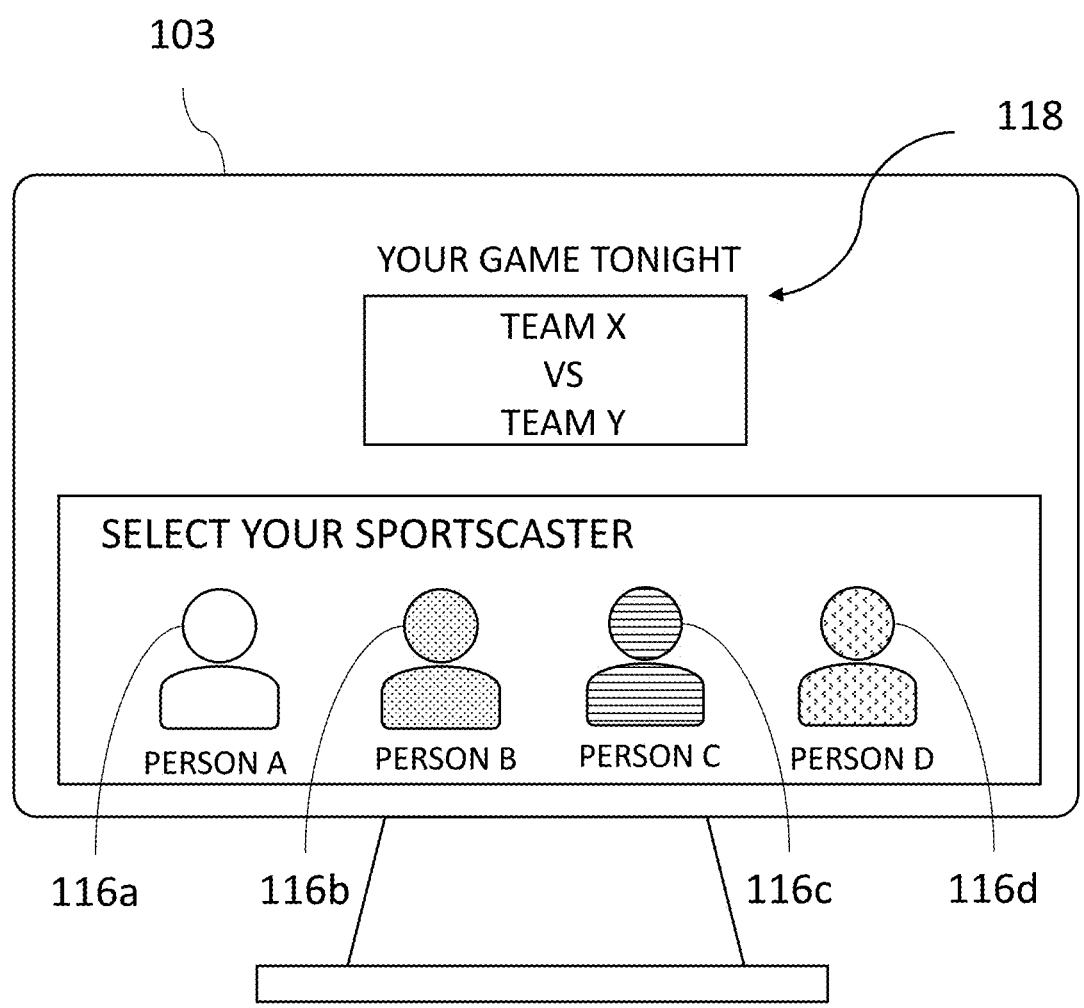
FIG. 1B illustrates an example of a graphical user interface with which a user interacts in order to select a virtual persona model.

FIG. 1B illustrates an example of a graphical user interface with which the user may interact in order to select a virtual persona model 116. In particular, FIG. 1B illustrates a user device 103, such as a television, showing a graphical user interface comprising a plurality of virtual persona models A-D 116a-d, each corresponding to a particular sportscaster. In this example, the graphical user interface further comprises information on the competition activity 118 which the user 102 is about to view (e.g., information on the sporting activity comprising the teams which will be competing). The user 102 may interact with the graphical user interface in order to select a virtual persona model 116 to provide customized commentary 101 from among the plurality of virtual persona models A-D 116a-d. For example, where the user device 103 comprises a touch interface, the user 102 may select a virtual persona model 116 by touching the portion of the screen corresponding to their preferred virtual persona model 116. Where the user 102 interacts with the user device 103 via a remote interface, such as a remote control, the user 102 may navigate the graphical user interface by interacting with the controls of the remote control in order to select their preferred virtual persona model 116. In the example of FIG. 1A, it may be assumed that the user 102 has selected Person A 116a as the virtual persona model 116 to be used to generate customized commentary 101.

Once the virtual persona model 116 has processed the information 114 relating to the event to produce customized commentary 101, the customized commentary 101 in this example is then output to the user device 103 as audio data to describe the events of the competition activity 110 as they are displayed to the user 102.

Figure 2:
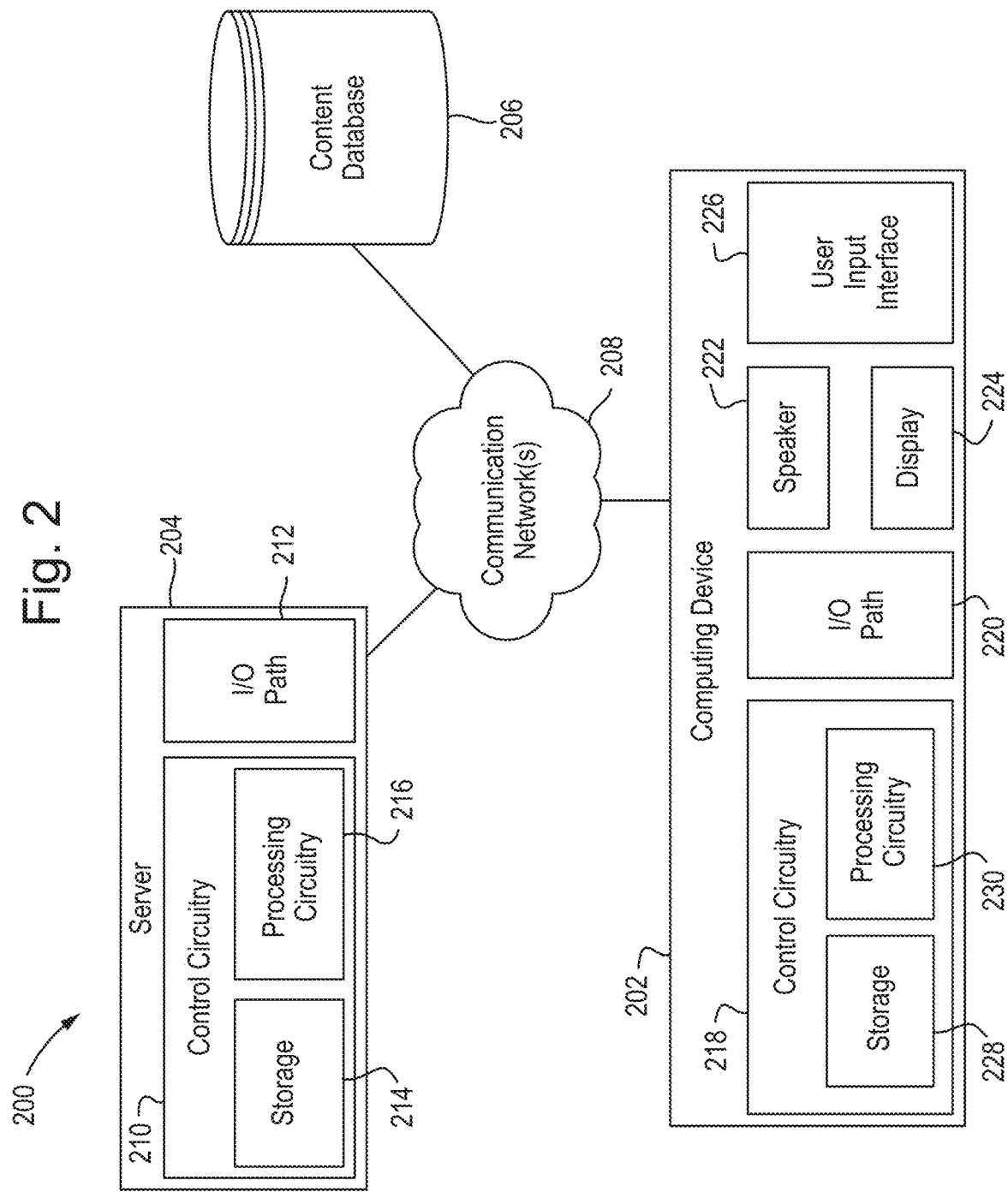
FIG. 2 is a block diagram showing components of an example system for generating customized commentary, in accordance with some examples of the disclosure.

FIG. 2 is an illustrative block diagram showing an example system 200, e.g., a non-transitory computer-readable medium, configured to produce commentary output. Although FIG. 2 shows system 200 as including a number and configuration of individual components, in some examples, any number of the components of system 200 may be combined and/or integrated as one device, e.g., as user device 103. System 200 includes computing device n-202 (denoting any appropriate number of computing devices, such as user device 103), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an MD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to generate customized commentary, to control circuitry 210 and/or 218 using user input interface 226.

User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
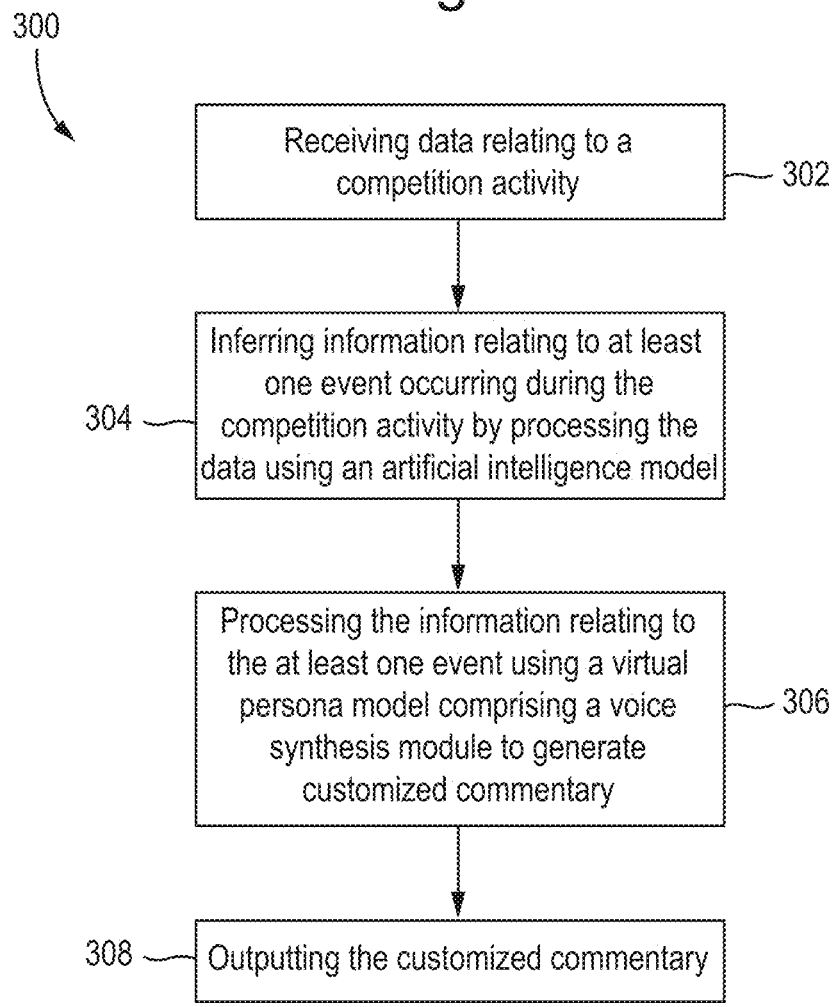
FIG. 3 is a flowchart representing a process for generating customized commentary, in accordance with some examples of the disclosure.

FIG. 3 shows a flowchart representing an illustrative process 300 for generating commentary such as customized commentary 101 as shown in FIG. 1A. The flowchart of FIG. 3 will be described in relation to FIG. 1. While the example shown in FIG. 3 refers to the use of system 100, as shown in FIG. 1A, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102, control circuitry of server 104, or control circuitry of a further device, working either alone or in some combination.

At 302, control circuitry, e.g., control circuitry of the server 104, or the user device 103, receives data relating to a competition activity 110. The data may be image data and/or audio data relating to the competition activity 110, such as a video stream. In some examples, the data relating to a competition activity 110 may be captured by a sensor such as an optical imaging device, e.g., a camera, by LiDAR, Radar, infrared sensors, an audio capturing device, an image capturing device, a video capturing device, microphones, or any other suitable data capturing device. The data may be a live stream or live feed of the competition activity 110 received from sensors. The data may be received from a plurality of cameras (e.g., fixed cameras, mounted cameras, mobile cameras, or drones). In some examples, the data may be a data stream corresponding to gameplay of a video game. For example, the data may be image data of gameplay of the video game, such as that displayed to the player, or may be data which can be used to generate image data to be displayed to the player of the video game.

At 304, control circuitry, e.g., control circuitry of the server 104, or the user device 103, infers information 114 relating to at least one event occurring during the competition activity 110 by processing the data, for example, using an artificial intelligence model. In an example, the artificial intelligence model utilizes computer vision processes. A computer vision process may interpret and analyze data, for example, any of image data, video data, audio data, to recognize objects, detect patterns, and make decisions. The artificial intelligence model may comprise means other than the computer vision process, such as a deep learning process or a trained model (e.g., trained on sensor data), in addition to or instead of the computer vision process. For example, data such as audio data may also be processed to infer information 116 relating to at least one event occurring during the competition activity 110. The data relating to the competition activity 110 may be processed using an AI (artificial intelligence), such as a data processing (trained) model, which may be configured (e.g. trained) to derive information 114 about the competition activity 110 from images, videos, and other inputs (e.g. such as from the sensors outlined above). For example, the data relating to the competition activity 110 may be processed to infer information 114 relating to at least one event occurring during the competition activity 110. The information relating to an event occurring during the competition activity 110 may comprise a current action, a predicted action, a predicted tactic, a predicted outcome, a time to a subsequent action, and/or a predicted urgency factor.

The data processing model may be trained to infer information 114 relating to at least one event based on data relating to the competition activity 110. In an example, the data processing model is trained to recognize actions (e.g., passes, homeruns, touchdowns, baskets, goals, red/yellow cards, penalties, free kicks, fouls), tactics, players and competition accessories such as game elements (balls, puck, nets, lines) in various types of competition activities, such as team sport games (ex. soccer, basketball, football, baseball, hockey), using a plurality of video and audio recordings of past games.

The data processing model may be trained to predict an action, tactic, outcome, or time to a subsequent action. For example, the model may be trained to infer the speed of actions as well as the difference between an action potentially leading to an exciting event in a game (e.g. a touchdown or a goal) versus an action that will require several further actions in order for an exciting event to be achieved. The data processing model may additionally be trained to recognize non-actions such as a ball caught by a spectator.

Synthetic data may be used to train the data processing model. For example, a data stream of a video game may be used to train the model, where particular game strategies may be played in the video game which are then be used to train the model to predict future actions and strategies from current actions. In an example, the data processing model may be trained by observing participants and a game accessory (such as a ball, puck, shuttlecock) in relation to key playfield elements such as lines, goals, and baskets, and learning to infer a proximity to a game objective, such as scoring a goal. For example, the overall placement of the participants (players) within a sporting arena, such as a field, pitch, or court, as well as the trajectory of the game accessory within the sporting arena over time may be used to train the model to infer tactics that comprise a plurality of actions. The data processing model may be trained to infer future actions by determining a tactic currently being used, and determining how far along in the tactic the current action is, and therefore determining likely further actions. By determining how far along in a tactic the current action is, and the actions which remain to be performed before the tactic is completed, a time to achieving the aim of the tactic may also be predicted.

The likely time to the completion of a tactic may be used to predict an urgency factor. The data processing model may be trained using, for example, player placement in a competition activity arena (such as a field), density of players within the arena (particular when proximate to competition accessories such as a ball), and the success rate of tactics similar to a tactic being used, where the data processing model may be trained to infer a probability of success of the tactic in progress in addition to the likely time to the completion of the tactic. In an example, the data processing model may be trained to infer the probability of success of a tactic or action in multi-player team ball games such as football, soccer, basketball, rugby, hockey, based on the density of adversary players around and ahead of the player controlling the game accessory as well as the relative speed of each of the adversary players converging towards the player controlling the game accessory. In an example, the data processing model may also take into account factors such as whether the player controlling the game accessory has the opportunity to pass the game accessory to other teammates, and consider the effect of passing the game accessory to another teammate when considering whether an objective, such as scoring a goal, can be achieved, where this factor may also be considered when assessing the probability of success of a current action.

The urgency factor may relate to how soon the tactic will be completed in addition to a probability of success of the tactic. For example, in soccer, as a ball is moved further towards a goal, it may be predicted that the next contact made by a player with the ball may be a shot at a goal, and therefore the urgency factor may be high. In another example, where players are passing the ball back towards their own goal, it may be predicted that several more actions will be required before the ball approaches the opponent's goal. Therefore, the likelihood that an exciting event is about to occur is low, and the predicted urgency factor may be determined to be low.

In an example, the data processing model is trained to detect changes in play (for example a counterattack) by tracking the overall progression of the game accessory over time projected onto the two dimensional (2D) plane of the competition activity 110 arena, as well as based on information regarding the team in control of the game accessory.

Figure 4:
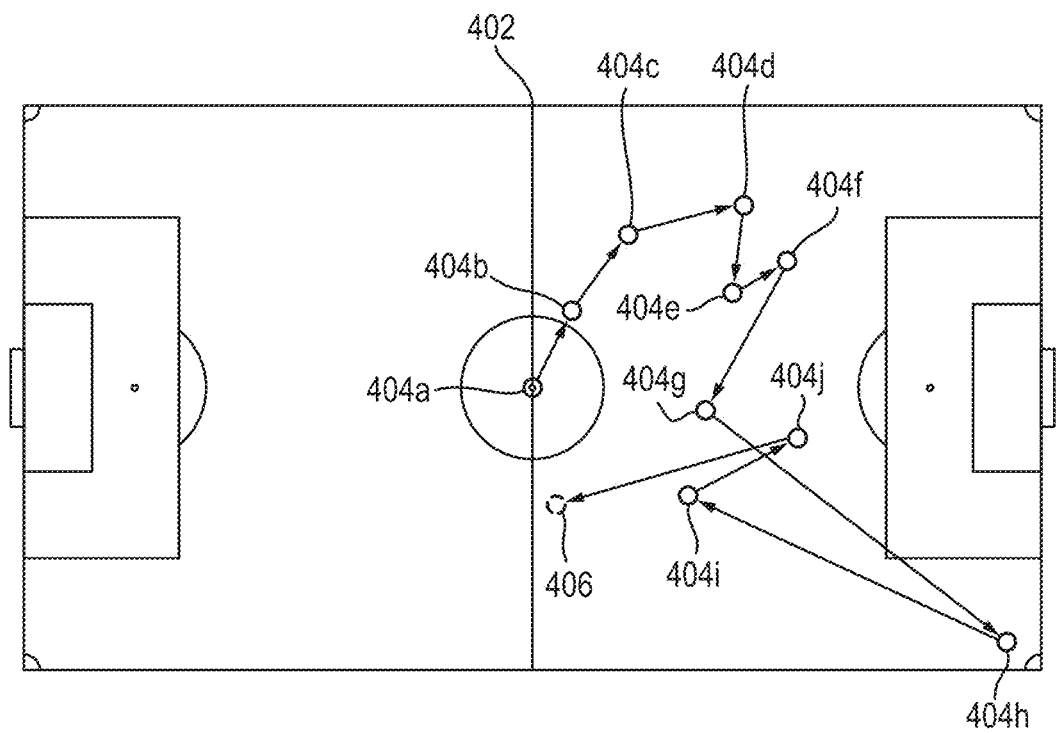
FIG. 4 illustrates an example of training data, in accordance with some examples of the disclosure.

FIG. 4 illustrates an example of a change in play which may be used as training data, where the possession of a game accessory changes from one team to another. In particular, FIG. 4 illustrates a game of soccer on a soccer pitch 402 (a player is indicated by a circle), where a ball (not shown) is passed from players 1 to 10 of a first team 404a-404j as illustrated by the arrows between the players, and is then intercepted by a player of a second team 406. The change of play therefore occurs when the second team obtains control of the ball. This 2D representation, along with an annotation of each action performed (e.g., ball passed from a first player to a second player, ball intercepted by player of second team) and/or tactics used may be used as training data, or the 2D representation may be used unannotated to train the model to infer an outcome.

Figure 5A:
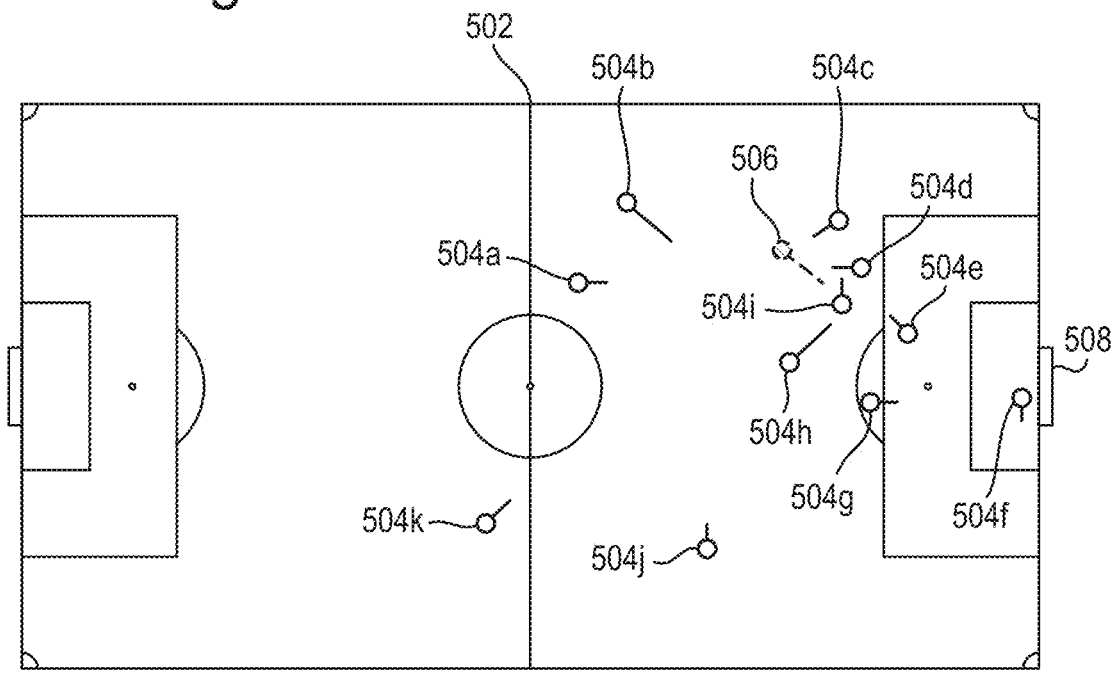
FIG. 5a and FIG. 5b illustrate examples of training data, in accordance with some examples of the disclosure.
Figure 5B:
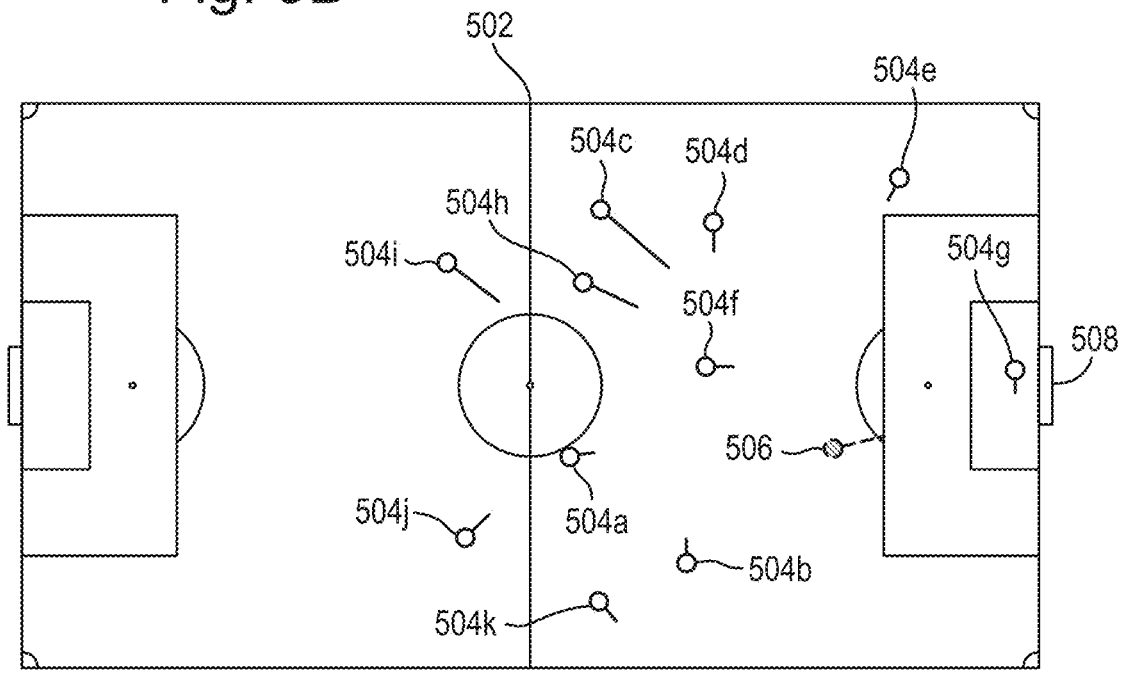

FIGS. 5a and 5b illustrate examples the movement of players on a soccer pitch which may be used as training data. FIG. 5a illustrates a low probability of success of an objective, and FIG. 5b illustrates a high probability of success of an objective. In these Figures, a player is indicated by a circle, where a line extending from the circle shows the trajectory of the player (e.g., the speed and direction).

FIG. 5a illustrates players 1 to 11 of a first team 54a-54k and a player of a second team 506. The player of the second team 506 has the ball (not shown). As is shown in this Figure, the player of the second team 506 is surrounded by players of the first team 504a-504k, with a number of players of the first team 504a-504k between the player of the second team 506 and a goal 508. The likelihood of the player of the second team 506 achieving an objective of scoring a goal is therefore low, as it is unlikely that the player of the second team 506 will be able to move the ball into the goal 508 without the ball being intercepted by a player of the second team. This 2D representation along with an annotation of "low likelihood of success" may be used as training data.

FIG. 5b illustrates players 1 to 11 of a first team 504a-504k and a player of a second team 506. The player of the second team 506 has the ball (not shown). As is shown in this Figure, the player of the second team 506 is ahead of most of the players of the first team 504a-504k in a direction towards a goal 508, where only the goalkeeper 504g is between the player of the second team 506 and the goal 508. Therefore, the player of the second team 506 in possession of the ball only needs to move the ball past the goalkeeper 504g and into the goal to score. The likelihood of the player of the second team 506 achieving an objective of scoring a goal is higher than that of the situation shown in FIG. 5a, and may be considered to have a high probability of success of achieving the objective of scoring a goal. This 2D representation along with an annotation of "high likelihood of success" may be used as training data.

Scenarios such as those illustrated in FIGS. 4, 5a and 5b may therefore be used as training data to train the model, for example, to detect actions, changes in play, and to predict likely outcomes. It will be appreciated that scenarios such as those above may be generated in order to train the model, may be based on previous competition activities, such as footage from those activities, using image data of a video game, or any other appropriate data illustrating actions of participants of a competition activity 110. For example, game play may be synthetized using realistic rendering computer programs such as a game engine (e.g., synthetic data may be used to train the model, for example, if real data (video/audio/motion) feeds from real events are not available or there is not a sufficient number of events or variety of events to train the model). The examples herein are generally explained in relation to ball games such as soccer, however, it will be appreciated that the methods may be adapted in order to be applicable to other competition activities.

In an example, information 114 relating to an event is processed to generate an incident script comprising at least one currently occurring incident corresponding to the event (e.g., an action, predicted tactic, or a non-action) described using vocabulary corresponding to the competition activity 110. For example, the information 114 relating to the event may be processed to generate an incident script comprising a description of incidents occurring during the competition activity 110. The vocabulary used for different types of competition activity 110 may differ, where the incident script may use vocabulary to describe the current competition activity 110 which is relevant to that competition activity 110.

In an example, an information processing model may be trained to process the information 114 relating to the at least one event. The information processing model may be trained to generate an incident script comprising at least one currently occurring incident corresponding to the event described using vocabulary corresponding to the competition activity 110. The incident script may be generated by an ontology model comprised in the information processing model which is trained to receive as input the information 114 relating to the at least one event, for example, comprising a current action, a predicted action, a predicted tactic, a predicted outcome, a time to a subsequent action, and output an incident script.

A plurality of ontology models may be trained for a plurality of competition types so that the incident script (and the customized commentary 101) uses vocabulary appropriate for incidents of the particular competition type. For example, a fault is a term that indicates a non-allowed action in tennis, whereas a foul indicates a non-allowed action in soccer. While both soccer and tennis may comprise some of the same terminology, e.g., a ball is used in both types of competition, other terminology is different. The plurality of ontology models may therefore be trained in multiple vocabularies each corresponding to a different competition type, so that the correct terminology is applied for a particular competition type by using the appropriate ontology model.

The information 114 relating to the event may be processed to determine whether ancillary information related to or unrelated to the competition activity 110 is to be incorporated into the customized commentary 101, and where it is determined that ancillary information is to be incorporated, incorporating the ancillary information. For example, ancillary information may be incorporated, such as information relating to the competition activity 110 or another competition activity, information relating to a player of the competition activity 110, information relating to current events, information relating to interests of a user 102, or an advertisement/advertising content. The ancillary information may be information on a particular player of a team, for example, statistics on the number of times a player has scored in a current league. The ancillary information may equally be information unrelated to the competition activity 110, such as current events, or the weather. It may be determined based on the information 114 relating to the event when to incorporate the ancillary information. For example, ancillary information regarding a particular player may be incorporated when that player has possession of a competition accessory, such as a ball, or ancillary information may be incorporated when no exciting events are occurring (e.g., ancillary information may be incorporated based on an urgency factor, for example, where the urgency factor is low, ancillary information may be incorporated).

The data processing model may determine the content of the ancillary information based on current events in the game (e.g. based on training of such events and the corresponding ancillary information). For example, the data processing model may infer an appropriate or optimal subject to select at a current time to be incorporated into the customized commentary 101. For example, the data processing model may determine to incorporate information on a player's scoring history after that player has scored.

In an example, the data processing model may be configured to insert ancillary information comprising targeted advertisement ("plugs") into the customized commentary 101. These advertisements may be personalized to the user 102 and may refer to the user 102 by name to provide an immersive and hyper-personal experience (ex. "You know Joe, our sponsor X is having a sale next week, you should check it out!").

In an example, the data processing model may be configured to insert ancillary information comprising personalized comments for the user 102, for example, by asking questions of the user 102 (e.g., "Joe, did you see that homerun?"). In a further example, the data processing model may incorporate information of upcoming commitments of the user 102 logged in their calendar (e.g., "Bob, I know you're enjoying the game, but it's time to go pick up the kids at school").

In an example, the data processing model may be configured to insert ancillary information in the form of answers to questions (e.g., "Who just scored?") received from the user 102 (for example, through a smart speaker) into the customized commentary 101. In a further example, the data processing model may detect that the user 102 is no longer watching the competition activity 110 (e.g., it may be detected that the user 102 has left the room in which the competition activity 110 is displayed) and may auto-pause the broadcast comprising the competition activity 110 and the customized commentary 101. When it is detected that the user 102 has resumed watching the competition activity 110 (e.g., it may be detected that the user 102 has re-entered the room in which the competition activity 110 is displayed), the data processing model may instruct the information processing model to offer to summarize events of the competition activity 110 from the point when the user 102 stopped watching, or to resume commenting in real-time. In a further example, the information processing model may offer to summarize the events of the competition activity 110 if the user 102 pauses the broadcast or the associated customized commentary 101.

In an example, the data processing model may incorporate a request for the user 102 to cheer for their team to be shared with a plurality of other users (e.g., "Let's all hear Joe celebrating Barcelona's goal!").

In an example, the data processing model may detect persons such as celebrities who are watching the competition activity 110, and the data processing model may direct the information processing model to incorporate comments on the detected persons. In a further example, video footage, for example, of the competition activity 110, may be modified to incorporate footage of the detected person watching the competition activity 110.

In an example, the user 102 may provide permission for the data processing model to access information relating to the user's fantasy (e.g. fantasy football) team, and the data processing model may direct the information processing model to incorporate commentary comprising ancillary information relating to players of the fantasy team, particularly those players of the fantasy team who are also currently players in the competition activity 110. The data processing model may then direct the information processing model to incorporate information on the player and any consequences for the fantasy team of the user 102 (e.g., commentary such as "Amazing Joe, player X scores, your team is now winning!" or "Aw, sorry Bob, but Joe's player scored, and your team is now behind!").

In an example, a plurality of data processing models are inferring information relating to an event occurring in another competition activity 110 (other than the one being viewed by the user 102) in which the user 102 has an interest, such as based on the players of a fantasy team of the user 102 who may be playing in different competition activities, or based on games or teams on which the user 102 has placed bet. The information processing model may receive ancillary information regarding the events occurring in the other competition activities, and may determine that the ancillary information is to be incorporated into the customized commentary 101. For example, the information processing model may receive information from any other data processing model, and generate customized commentary 101 comprising ancillary information including information on events occurring in other competition activities (e.g., "Good news Bob, your team is now ahead because X scored a touchdown in game Y as we speak!"). Similarly, in another example, if the player has provided access to bets that they have made on various competition activities, the data processing models processing data relating to the competition activities on which the user 102 has placed a bet may provide to the information processing model information on events occurring which may have a positive or a negative impact on the bets made by the user 102 (e.g., "X vs Y score is now A-B. Your bet is C-D"). In another example, data processing models assessing competition activities which have been bet upon by the user 102 may infer a probability that the game scores bet by the user 102 are the final results based on the progress of the competition activity 110 and past competition activity 110 results. This information may be presented to the user 102 by incorporating the information into the customized commentary 101 (e.g., "X vs Y score is now A-B. Your bet is C-D", your odds are now 1:C"). Furthermore, this information may be used to determine the tone with which the information should be conveyed to the user in the customized commentary 101, for example, where the information is positive for the user 102 (e.g., the user has won a bet), the delivery may be presented in a positive tone (e.g., happy), and where the information is negative for the user 102 (e.g., the user has lost the bet), the delivery may be presented in a negative tone (e.g., sad).

The data processing model may also receive information on the league and teams of the competition activity 110, and direct the information processing model to incorporate such information in the customized commentary 101. In one example, customized commentary 101 may incorporate an introduction to the competition activity 110 by incorporating ancillary information about the competition activity 110 such as game location, date, venue, league info, team info, player roster, substitutes, and information on the coach and referees. This information may be provided by the broadcaster. In one example, this ancillary information may be updated in real time based on events occurring in a plurality of competition activities which are assessed by a plurality of models.

Ancillary information may be incorporated into the customized commentary 101 based on the virtual persona model 116. For example, the ancillary information may comprise information that the persona on which the virtual persona model 116 is based would discuss.

Figure 6:
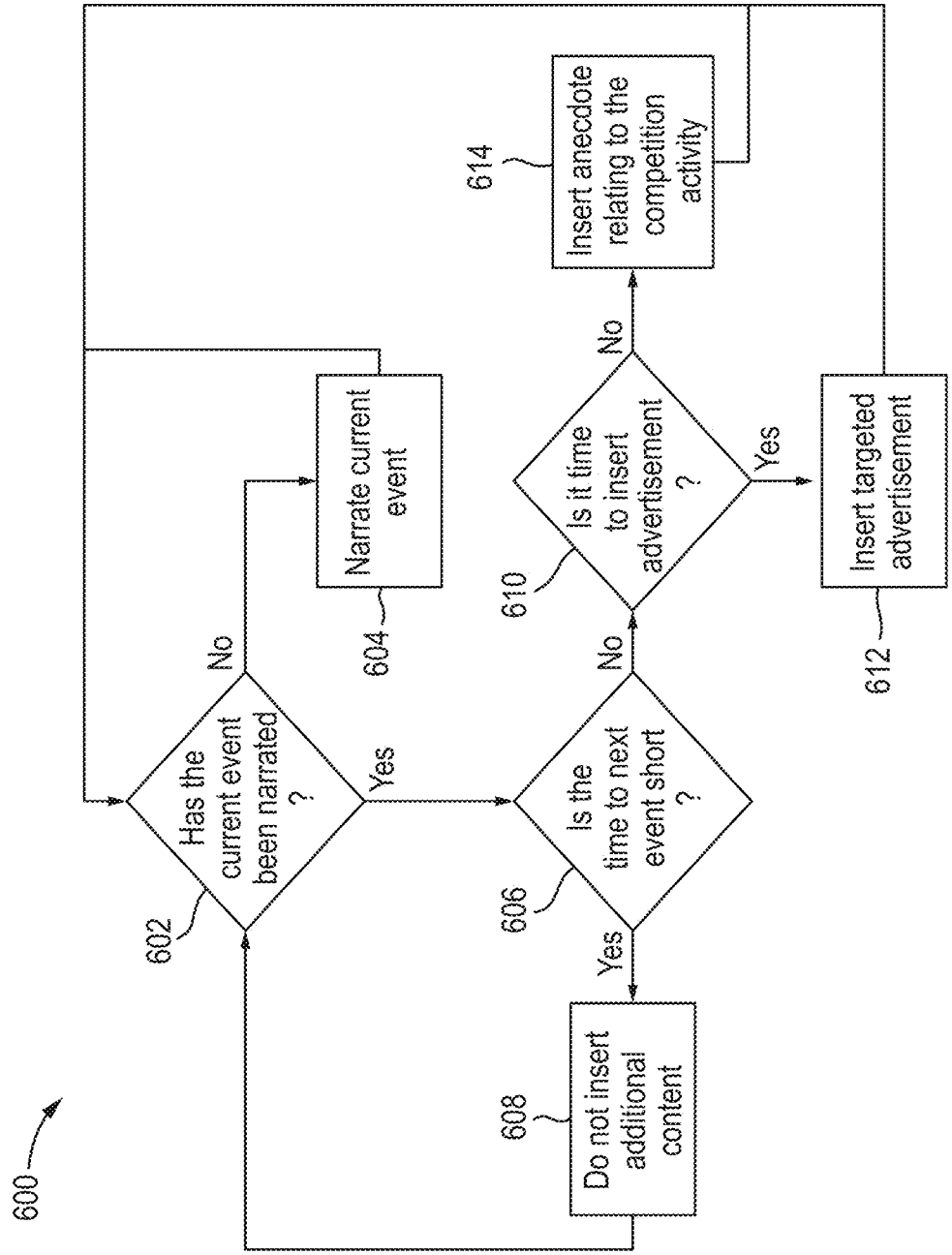
FIG. 6 illustrates a flowchart for determining the content of customized commentary, in accordance with some examples of the disclosure.

FIG. 6 illustrates a flow diagram 600 for determining the content of the customized commentary 101. At step 602, it is determined whether the current event has been narrated. Where the current event has not been narrated (e.g. commentary describing the event has been generated) (NO at step 602), the process moves to step 604. At Step 604, the current event is narrated, and the process moves back to step 602.

Where, at step 602, it is determined that the current event has been narrated (YES at step 602), the process moves to step 606. At Step 606 it is determined whether the time to the next event is short. Where it is determined that the time to the next event is short (YES at step 606), the process moves to step 608. At step 608, no additional content is added to the customized commentary 101 and the process moves back to step 602.

Where it is determined at step 606 that the time to the next event is not short (NO at step 606), the process moves to step 610. At step 610, it is determined whether it is time to insert an advertisement. Where it is determined that it is time to insert an advertisement (YES at 610), at step 612 a targeted advertisement is incorporated, and the process moves to step 602.

Where it is determined at step 610 that it is not time to insert an advertisement (NO at step 610), the process moves to step 614, and an anecdote relating to the competition activity is incorporated into the customized commentary 101. The process then moves to step 602.

At 306, control circuitry, e.g., control circuitry of the server 104, or the user device 103, processes the information 114 relating to at least one event using a virtual persona model 116 comprising a voice synthesis module 118 to generate customized commentary 101. For example, the information processing model may comprise a virtual persona model 116 comprising a voice synthesis module 118. The virtual persona model 116 may directly or indirectly process the information 114 relating to the event. For example, the virtual persona model 116 may be trained to generate customized commentary 101 based on input comprising the incident script (which has been generated based on the information 114 relating to the event) and information 114 relating to the event, such as comprising the predicted urgency factor. As is described in relation to FIG. 1A, the virtual persona model 116 may process the information 114 to generate commentary having any of a particular voice, delivery style, tone, idiolect, and/or personality. The virtual persona model 116 may correspond to a virtual persona, a virtual persona being a virtual representation of a persona of, for example, a particular person such as a celebrity, or an artificially generated persona, for example, generated based on a plurality of different personas. For example, the virtual persona model 116 may process the incident script and any further information 114 relating to the event to output commentary which imitates the voice, delivery style, tone, idiolect, and/or personality of a particular person such as a celebrity. The virtual persona model 116 may have been trained to mimic the speech of a particular person based on recordings of the person, for example, recordings of the person commentating on competition activities. The voice synthesis module 118 may apply a particular voice, tone, and pronunciation corresponding to the virtual persona to the commentary. In a further example, the virtual persona model 116 may further comprise a personality module. The personality module may apply a delivery style, vocabulary, and grammar corresponding to the virtual persona to the commentary.

In an example, the information 114 relating to at least one event occurring during the competition activity is processed to produce secondary customized commentary generated using a second virtual persona model, wherein the customized commentary and the second customized commentary relate to different events (e.g., where the customized commentary describes a particular type or set of events, such as the actions of one team, and the second customized commentary describes a different type or set of events, such as the actions of an opposing team). For example, there may be provided a plurality of virtual persona models, each virtual persona model corresponding to a different persona. In an example, a group of virtual persona models may be trained to sound like a plurality of personas, such as sportscasters, based on audio recordings of sportscasters commentating on past games. In an example, the user 102 may select a virtual persona model corresponding to a celebrity such as an actor or influencer. Where the virtual persona model 116 is based on a persona that is not a commentator of competition activities, the virtual persona model 116 may additionally be trained using commentary of a commentator of the competition activity in order that the virtual persona model 116 outputs more natural commentary regarding the incidents occurring in the competition activity. In an example, a plurality of virtual persona modules generate commentary on the same competition activity, and generate commentary that is responsive to the commentary of other virtual persona models, for example, by generating different comments with different tone and delivery style. Thus, a more realistic commentating experience may be provided which is similar to that of sportscasters who are commentating on a sporting activity together.

The different virtual persona models may narrate different events. For example, one virtual persona model may be assigned a primary or play-by-play role (e.g., wherein the first virtual persona model describes the game or event as it occurs), and the second virtual persona model may be assigned a secondary or color commentary role (e.g., wherein the second virtual persona model provides content when a play is not in progress by, e.g., commenting on strategy or tactics, providing an analysis of the current event, providing information about the teams, players, or leagues, providing anecdotes or jokes, etc.).

The customized commentary may be produced to incorporate commentary which is reactionary to a secondary customized commentary, wherein the secondary customized commentary is generated using a second virtual persona mode. Thus, commentary may be provided that simulates commentary where more than one commentator is commentating on a competition activity. In one example, one virtual persona model takes a first side (e.g. takes the side of one team), and another virtual persona model takes the opposing side (e.g. takes the side of the opposing team), so an event may be relayed as being positive or negative depending on which side the virtual persona model takes. In an example, this commentary may incorporate a joke. For example, after a successful outcome for a team that a virtual persona model is configured to support (such as a goal), the virtual persona model may joke about the successful outcome to another virtual persona model supporting the opposing team.

In an example, the various virtual persona models are presented to a user 102 in order that a user 102 may select their preferred persona. In one example, the virtual persona models are presented in an order that represents their popularity with the user 102 (e.g., if the user 102 has previously selected a virtual persona model for a similar game, that virtual persona model may be presented first, or most prominently). In a further example, the virtual persona models may be ordered based on a plurality of parameters, comprising at least one of: broadcaster choices, popularity amongst other viewers with similar profiles, or team affinity. The virtual persona models may be displayed to the user 102, for example, on user device 103, where the user may make a selection of a virtual persona model using an interface, for example, a remote controller of the user device 103, a smartphone, a tablet, or a smart speaker.

In an example, the virtual persona model 116 is selected by a user 102 or is selected by a broadcaster, or is based on user preferences. For example, a virtual persona model may be selected or recommended to a user, for example, based on interests of the user, where a recommended virtual persona model may be associated with those interests. In one example, a user 102 may select from a plurality of virtual persona models in real time, and may alter their selection by selecting a different virtual persona model as the game progresses. This may only affect the output from the virtual persona model—the rest of the processes may continue as they were.

In an example, the user 102 may be listening to the customized commentary 101 without additionally viewing the competition activity, for example, in a car setting. The user 102 may select a virtual persona model 116 using a voice command (e.g., "Commentate game X in the style of Y"). In another example, a voice command selecting a virtual persona model 116 may also trigger the competition activity to be displayed, for example, on a television or an equivalent visual renderer (e.g., a holographic display or a hologram projection device).

In an example, an image of the persona on which the virtual persona model 116 is based (e.g., 3D model), or images of each persona where a plurality of virtual persona models are commentating on the competition activity may be displayed alongside the competition activity. In particular, the image of the persona may be animated to appear to speak the customized commentary 101 produced by the corresponding virtual persona model 116 that is output alongside the competition activity. The image of the persona may additionally be animated to reflect the emotions inferred by the customized commentary, such as urgency or excitement. The image may be presented on the same display as a display showing the competition activity, or on a different display (or as a projection), and may be presented as an overlay or separate to the competition activity.

At 308, control circuitry, e.g., of the server 104, or the user device 103, outputs the customized commentary 101. For example, the server 104 may output the customized commentary 101 to the user device 103. Alternatively or additionally, the user device 103 may output the customized commentary 101, for example, as audio output. Customized commentary 101 may additionally or alternatively be output as a transcript, for example, to be read by a person when commentating on a competition activity in order that they are able to talk knowledgably about the competition activity. In a further example, a transcript of the customized commentary 101 may be produced by a virtual persona model 116 corresponding to the persona who will commentate on the competition activity, for example, so that a person who is not knowledgeable about a competition activity may narrate the competition activity knowledgeably and using their own speech patterns and mannerisms by reading the customized commentary which incorporates the speech patterns an mannerisms of the person.

The virtual persona model 116 may output customized commentary 101, which may be output to the user 102, while other aspects such as the data processing model and information processing model continue to process continuously received data relating to the competition activity in order to infer ongoing events in real-time. For example, as the information processing model is providing commentary on the competition activity, the data processing model may continue to "watch" the game to enable the generation of further commentary.

In an example, a virtual persona module production service may be provided to enable any person to produce a virtual persona model 116 corresponding to their persona, which may then be made available for selection for commentating on a competition activity. The virtual persona module production service may involve receiving from a person, comments on a competition activity, where a virtual persona model 116 may then be trained to imitate the person's pitch, tone, accent, and delivery as is described above. In a further example, a person who has used the virtual persona module production service may be rewarded if their virtual persona model 116 is selected to produce customized commentary 101 on a competition activity by a sufficient number of users.

The method described in relation to FIG. 3 may be performed by a commentary generating artificial intelligence (AI), such as a trained model. A trained model may comprise any model that may be trained to take as input data (e.g., such as image data, video data, audio data, motion data, and so on) and output commentary. In some examples, the model comprises a supervised machine learning model. In another example, a model may be trained using support-vector regression, or Random-Forest regression or other non-linear regressor. In some examples, the model may comprise a random forest model or a decision tree. The model may comprise a classification model, or a regression model. The trained model may be a trained neural network. For the avoidance of doubt, neural networks are a type of supervised machine learning model that may be trained to provide an output for given input data. Neural networks may be trained by providing training data comprising example input data and the corresponding "correct" or ground truth outcome. Neural networks may comprise a plurality of layers of neurons, each neuron representing a mathematical operation that may be applied to the input data. The output of each layer in the neural network is fed into the next layer to produce an output. For each piece of training data, weights associated with the neurons may be adjusted until optimal weightings are found that produce predictions for the training examples reflecting the corresponding ground truths.

Figure 7:
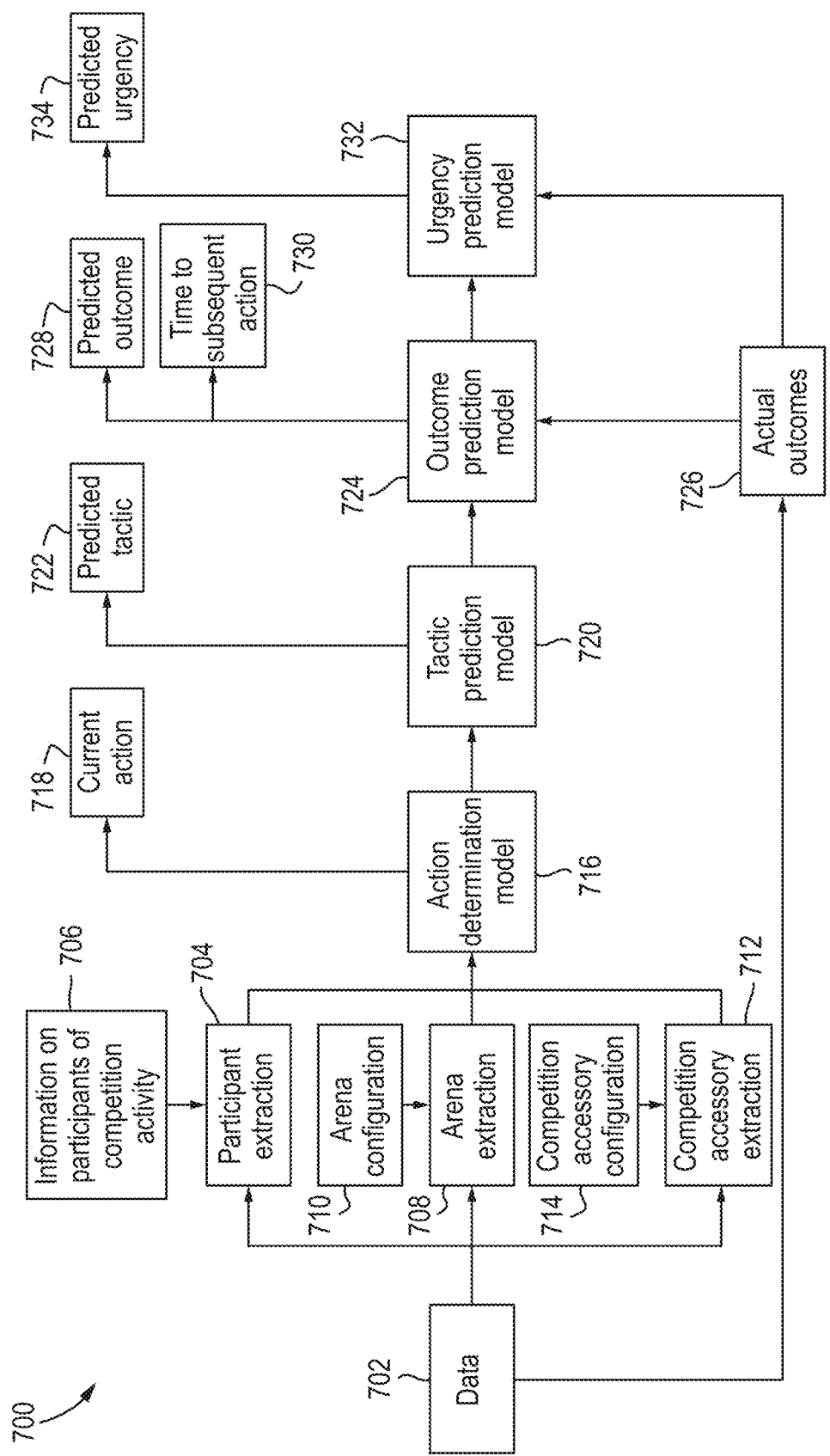
FIG. 7 is an example of a model used to generate customized commentary, in accordance with some examples of the disclosure.
Figure 8:
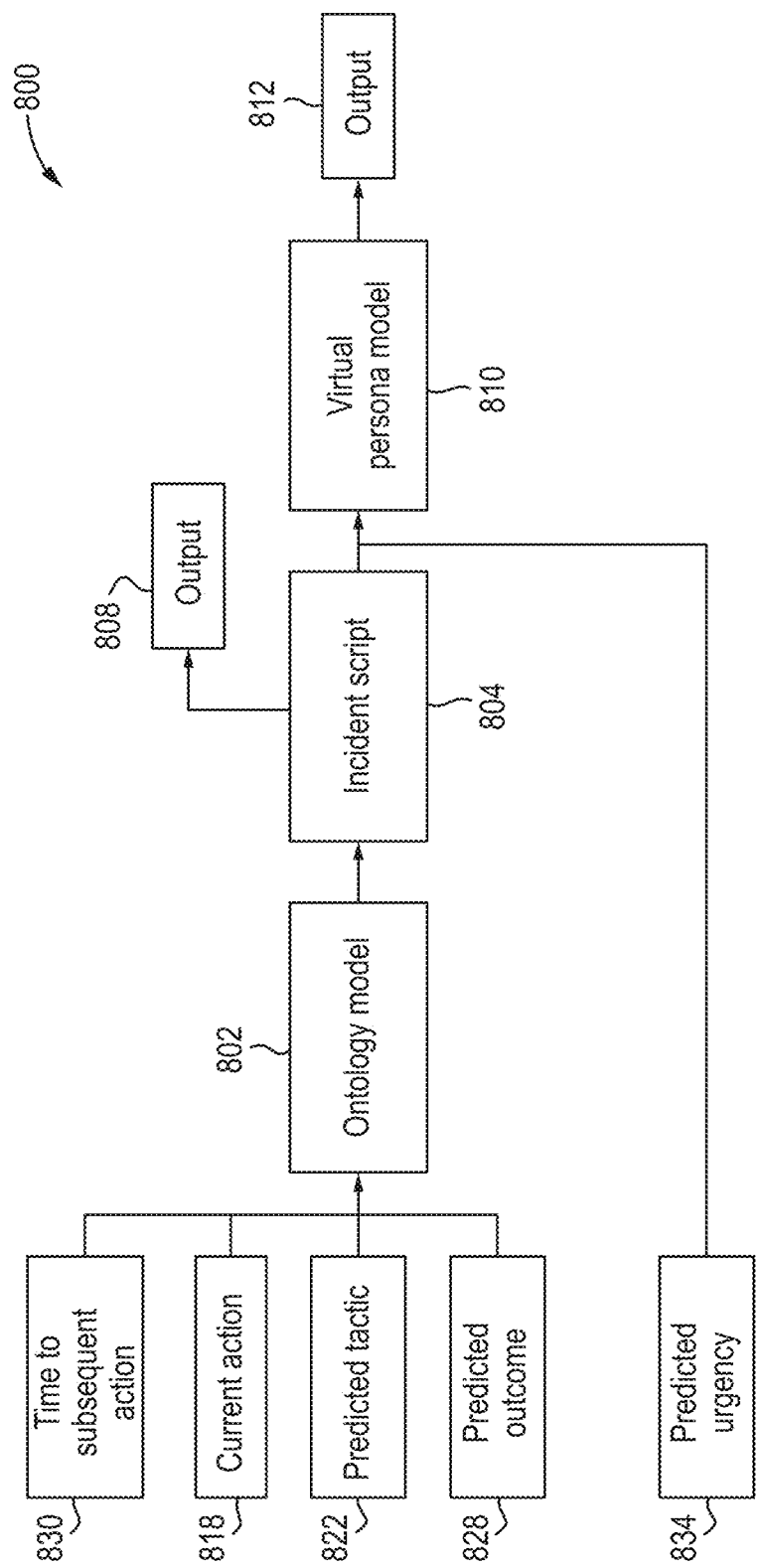
FIG. 8 an example of a model used to generate customized commentary, in accordance with some examples of the disclosure.

FIGS. 7 and 8 illustrate an example of an artificial intelligence that may be used in order to implement the example of FIG. 3 to generate customized commentary 101. In particular, FIG. 7 illustrates a part of the AI for the generation of information 114 relating to at least one event occurring during the competition activity (e.g., a data processing model). FIG. 8 illustrates a part of the AI for the processing of the information relating to the event to generate customized commentary 101 (e.g., an information processing model). In this example, the AI is shown as two AIs, a first AI and a second AI, however, it will be appreciated that one AI may be used to implement the steps, or several AIs may be used.

The AI may comprise a data processing model for inferring information 114 relating to at least one event occurring during the competition activity. FIG. 7 illustrates an example of the data processing model 700.

The data processing model 700 receives data 702 relating to a competition activity, for example, from a sensor. The data 702 relating to the competition activity is input to a participant extraction module 704. The participant extraction module 704 may further receive information on participants of the competition activity 706. The participant extraction module 704 may be configured to determine the participants of the competition activity, for example using the information on the participants of the competition activity 706, for example, information on a league in which the competition activity is included, and/or a roster configuration of the participants of the competition activity. The data 702 is also input to an arena extraction module 708. The arena extraction module 708 further receives an arena configuration 710. For example, the arena extraction module may receive information on the configuration of an arena of the competition activity. For example, where the competition is soccer, the arena may be a pitch, where the competition activity is chess, the arena may be a chess board, where the competition activity is swimming, the arena may be a swimming pool. The arena configuration 710 may therefore provide information on the type of arena to be used in a type of activity corresponding to the competition activity (e.g. a swimming pool where the activity is swimming), and the particular configuration of the arena for competition activity of the competition activity (such as an Olympic pool or a standard pool, the location of nets or goals in sports using nets or goals). The data 702 is also input to a competition accessory extraction module 712. The competition accessory extraction module 712 further receives a competition accessory configuration 714. For example, the competition accessory configuration 714 may comprise information on the types of competition accessories to be used in the competition activity. For example, where the competition is soccer, the competition accessory may comprise a ball, a red card, a yellow card.

An action determination model 716 may receive, from the participant extraction module 704, information on participants of the competition activity, such as the location of participants, the location of participants relative to other participants, information on the purpose of participants, such as their positions in soccer, preferred tactics, past behavior in previous competition activities. The action determination model 716 may further receive, from the arena extraction module 708, information on the arena used in the competition activity, such as the configuration of the arena, the location of participants within the arena, points of particular interest of the arena, such as the location of a goal. The action determination model 716 may further receive, from the competition accessory extraction module 712, information on accessories to be used in the competition activity, such as the location of a ball on the field in soccer. Each module may use an artificial intelligence model in order to determine the information. For example, each module may derive information from videos and other visual inputs provided in the data 702 relating to the competition activity.

The action determination model 716 may also receive the data 702. The action determination model 716 may determine, based on the received information, a current action 718 occurring during the competition activity. For example, based on the location of participants, e.g., in relation to the competition arena and accessories of the competition activity, a currently occurring action may be determined. For example, in soccer, where the ball moves from one participant to another participant, it may be determined that the current action is a pass of the ball between a first participant and a second participant. The action determination model 716 may be configured to determine actions based on past actions. For example, the action determination model 716 may be trained to determine a current action based on past actions.

A tactic prediction model 720 may receive, from the action determination model 716, the current action (and any of the information passed to the action model 716). The tactic prediction model 720 outputs a predicted tactic 722. For example, the tactic prediction model 720 may predict a current tactic of the participants of the competition activity based on a current action, information on participants of the competition activity, information on the arena used in the competition activity, and information on accessories to be used in the competition activity. The tactic prediction model 720 may be configured to determine tactics based on past tactics. For example, the tactic prediction model 720 may be trained to determine a current tactic based on past tactics. The tactic prediction model 720 may further receive actual tactics. The actual tactics may be used to further train the prediction model by providing actual tactics for comparison with the predicted tactics, whereby the accuracy of the prediction can be adjusted.

An outcome prediction model 724 may receive, from the tactic prediction model 720 the current action 718, the predicted tactic 722, and any of the information passed to the action model 716. The outcome prediction model 724 may output a predicted outcome 728. For example, the outcome prediction model 724 may predict an outcome, such as the outcome of a tactic. For example, based on a determined tactic that participants of the competition activity are currently performing, and determining which part of the tactic is currently being played (e.g. based on the current action), the subsequent steps which may be taken by the participants may be predicted. The outcome prediction model 724 may further receive actual outcomes 726. The actual outcomes may be used to further train the prediction model by providing actual outcomes for comparison with the predicted outcomes, whereby the accuracy of the prediction can be adjusted. The outcome prediction model 724 may output a time to a subsequent action 730. For example, based on the predicted likely subsequent steps, it may be predicted when a next action will be performed if the participants perform the steps of the predict tactic. For example, where the goal of the tactic is to score a goal, e.g., in soccer, a prediction may be made as to the time taken to play out the tactic to the point that the participant can take a shot at the goal. The outcome prediction model 724 may be configured to predict tactics based on past tactics. For example, the outcome prediction model 724 may be trained to determine a current tactic based on past tactics.

An urgency prediction model 732 may receive, from the outcome prediction model 724 the current action 718, the predicted tactic 722, the predicted outcome 728, the predicted time to subsequent action 730, and any of the information passed to the action model 716. The urgency prediction model 732 may further receive the actual outcomes 726. The actual outcomes may be used to further train the prediction model by providing actual outcomes having corresponding urgency factors for comparison with the predicted urgencies, whereby the accuracy of the prediction can be adjusted. The urgency prediction model 732 may output a predicted urgency 734. For example, the predicted urgency 734 may comprise an urgency factor indicating the level of urgency, or excitement, which should be conveyed based on actions or predicted actions. For example, where there is a break in play, the urgency factor may be low, whereas where it is predicted that a participant is about to shoot at a goal, the urgency factor may be high. The urgency prediction model 732 may be configured to provide an urgency factor based on past events. For example, the urgency prediction model 732 may be trained to determine a current urgency factor based on the urgency of past events.

The data processing module 700 therefore outputs information 114 relating to at least one event occurring during the competition activity.

The method described in FIG. 3 may be performed by a commentary generating artificial intelligence (AI), such as a trained model. The AI may comprise an information processing model for generating customized commentary 101. FIG. 8 illustrates an example of an information processing model 800.

As is illustrated in FIG. 8, an ontology model 802 receives information relating to an event occurring during the competition activity, in particular, a current action 818, a predicted tactic 822, a predicted outcome 828, and a time to a subsequent action. For example, the information processing model 800 may receive the current action, the predicted tactic, the predicted outcome 828, and the time to a subsequent action determined by the data processing model 700 as shown in FIG. 7. The ontology model 802 may comprise a competition language configuration which indicates the terminology which applies to a particular type of competition activity. For example, each type of competition activity (e.g., soccer, tennis, badminton) uses different terminology to describe incidents occurring during the competition activity. While an action which is received by the ontology model may be described using a generic description, for example, that a ball is moved from a position close to a first participant to a position close to a second participant, a different description may be required depending on the type of competition activity (e.g., in tennis, moving the ball from one side of the court to another is termed an "exchange" or "rally", whereas in soccer, moving the ball from one participant to another is termed a "pass"). Thus, the correct terminology for the current competition activity can be used to describe events occurring in the competition activity.

The ontology model 802 may generate an incident script 804 by applying terminology corresponding to the appropriate type of competition activity (e.g., the type of competition activity corresponding to the competition activity currently being analyzed). The incident script may comprise a description of incidents occurring during the competition activity. The incident script may be output 808. In particular, the incident script may be output as a transcript, which may then be read by a person such as a celebrity, in order that they may commentate on a competition activity with no prior knowledge of the rules or terminology of the competition activity.

A virtual persona model 810 may receive the incident script. The virtual persona model 810 may additionally receive a predicted urgency 834, for example, the predicted urgency determined by the data processing model 700 as shown in FIG. 7. The virtual persona model 810 may generate output 812 comprising customized commentary 101. The virtual persona model 810 may comprise a voice synthesis module which applies a voice, tone, and pronunciation corresponding to a persona on which the virtual persona model is based to generate the customized commentary 101. For example, the voice synthesis module may determine how the output 812 sounds. The virtual persona model 810 may further comprise a personality module configured to generate customized commentary 101 corresponding to at least one of: a delivery style, vocabulary, and grammar of a persona on which the virtual persona model is based. For example, the virtual persona model 810 may determine the words used in the customized commentary 101, so that the commentary imitates the type of words which the persona on which the virtual persona model 810 is based would speak. In some examples, a plurality of virtual persona models is provided, where each virtual persona model may be configured to output customized commentary 101 corresponding to different personas, as is described above.

It will be appreciated that any of the modules or steps shown in FIG. 7 or 8 may be performed by any number of models (AIs) in any suitable alternative orders or in parallel to further the purposes of this disclosure. For example, all steps may be performed by one AI, or, for example, one AI may perform all the steps up to the generation of the incident script, where another AI may perform the steps of the virtual persona model (or a plurality thereof).

The data processing model may be trained to output information relating to the at least one event. Training data may be input to a learning model, the training data comprising data relating to a competition activity and event descriptions of the data corresponding to each of a current action, a subsequent action, a subsequent tactic, time to a subsequent action, a subsequent outcome. The learning model may be trained to output information relating to the at least one event comprising event descriptions based on an input comprising data relating to a competition activity.

The information processing model may be trained to output customized commentary. Training data may be input to a learning model, the training data comprising information relating to the at least one event, and commentary corresponding to the event. The commentary may relate to a particular person and/or may comprise, or indicate where to incorporate, ancillary information. The learning model may be trained to produce commentary based on an input comprising information relating to the at least one event.

Figure 9:
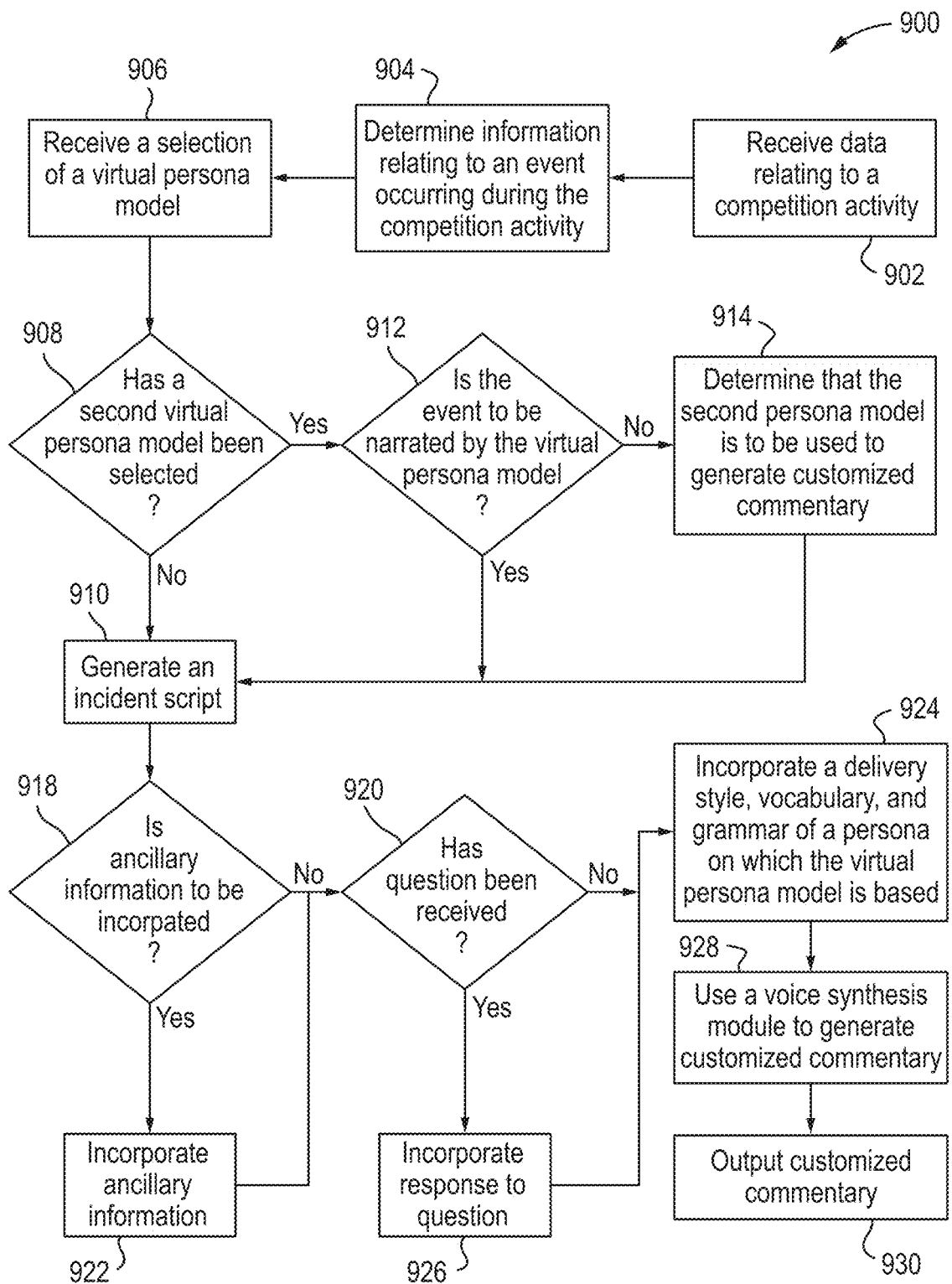
FIG. 9 illustrates a flowchart for generating customized commentary, in accordance with some examples of the disclosure.

FIG. 9 illustrates a flow chart illustrating a process 900 for generating customized commentary 101. At step 902, data relating to a competition is received. At step 904, information relating to an event occurring during the competition activity is determined. The information relating to an event occurring during the competition activity may comprise at least one of: a current action, a predicted action, a predicted tactic, a predicted outcome, a time to a subsequent action, a predicted urgency factor.

At 906, a selection of a virtual persona model is received, for example, a selection made by a user or broadcaster. At 908 it is determined whether a second virtual persona model has been selected. Where a second virtual persona model has not been selected (NO at 908), at 910 an incident script is generated.

Where a second virtual persona model has been selected (YES at 908), it is determined whether the event is to be narrated by the virtual persona model. Where the event is to be narrated by the virtual persona model (YES) at 912, an incident script is generated at step 910. Where it is determined that the event is not to be narrated by the virtual persona model (NO at step 912), it is determined at 914 that the second persona model is to be used to generate customized commentary. Then, an incident script is generated at step 910.

Once an incident script has been generated at step 910, it is determined at step 918 whether ancillary information is to be incorporated into commentary. The ancillary information may comprise at least one of: information relating to the competition activity or another competition activity, information relating to a participant of the competition activity, information relating to current events, information relating to interests of a user, and an advertisement. Where it is determined that ancillary information is to be incorporated, (YES at step 918), ancillary information is incorporated into the commentary. The process then moves to step 920. Where it is determined that ancillary information is not to be incorporated, (NO at step 918), the process moves to step 920.

At step 920, it is determined whether a question has been received, for example, from the user. Where a question has been received, (YES at 920) a response to the question is incorporated into commentary at step 926. The process then moves to step 924. Where a question has not been received. (NO at 920), the process moves to step 924.

At step 924, a delivery style, vocabulary, and grammar of a persona on which the virtual persona model is based is incorporated into the commentary. Then, at step 929, a voice synthesis module 118 is used to generate the sound of the commentary (e.g., a voice, a tone, and pronunciation corresponding to a persona on which the virtual persona model is based). Then, at 930, customized commentary 101 is output. Furthermore, a visual representation of the virtual persona model may also be output and, for example, may be animated to be synchronized with the output of the customized commentary 101.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, using control circuitry, data relating to a competition activity;
determining a selected virtual persona model of a plurality of virtual persona models based on a user-interface input;
inferring, using control circuitry, information relating to at least one event occurring during the competition activity by processing the data using an artificial intelligence model;
processing, using control circuitry, the information relating to the at least one event using the selected virtual persona model of the plurality of virtual persona models comprising a voice synthesis module to generate customized commentary comprising original content;
based at least in part on processing the information relating to the at least one event, determining a period of time associated with an occurrence of the at least one event;
based at least in part on determining that the period of time is less than or equal to a threshold period of time:
refraining from inserting an advertisement into the customized commentary; and
inserting into the customized commentary one or more anecdotes relating to the at least one event; and
outputting, using control circuitry, the customized commentary comprising the original content and the one or more anecdotes.

2. The method of claim 1, wherein the voice synthesis module generates the customized commentary comprising at least one of: a voice, a tone, and pronunciation corresponding to a persona on which the selected virtual persona model is based.

3. The method of claim 1, wherein the selected virtual persona model further comprises a personality module configured to generate the customized commentary corresponding to at least one of: a delivery style, vocabulary, and grammar of a persona on which the selected virtual persona model is based.

4. The method of claim 1, wherein the determining the selected virtual persona model comprises receiving a user-interface selection from a user or from a broadcaster.

5. The method of claim 1, wherein the information relating to the at least one event is processed to generate an incident script comprising at least one currently occurring incident corresponding to the at least one event described using vocabulary corresponding to the competition activity.

6. The method of claim 1, wherein the information relating to the at least one event occurring during the competition activity comprises at least one of: a current action, a predicted action, a predicted tactic, a predicted outcome, a time to a subsequent action, a predicted urgency factor.

7. The method of claim 1, wherein the information relating to the at least one event is processed to determine whether ancillary information related to or unrelated to the competition activity is to be incorporated into the customized commentary, and where it is determined that the ancillary information is to be incorporated, incorporating the ancillary information; and optionally,
wherein the ancillary information comprises at least one of: information relating to the competition activity or another competition activity, information relating to a participant of the competition activity, information relating to current events, information relating to interests of a user, and information relating to the advertisement.

8. The method of claim 1, wherein the customized commentary is produced to incorporate commentary which is reactionary to a secondary customized commentary, wherein the secondary customized commentary is generated using a second virtual persona model.

9. The method of claim 1, wherein the method further comprises processing the information relating to the at least one event occurring during the competition activity to produce secondary customized commentary generated using a second virtual persona model, wherein the customized commentary and the secondary customized commentary relate to different events.

10. The method of claim 1, wherein the method further comprises determining if a question has been received from a user, and where the question has been received from the user, incorporating a response to the question in the customized commentary.

11. A system comprising control circuitry configured to:
receive data relating to a competition activity;
determine a selected virtual persona model of a plurality of virtual persona models based on a user-interface input;
infer information relating to at least one event occurring during the competition activity by processing the data using an artificial intelligence model;
process the information relating to the at least one event using the selected virtual persona model of the plurality of virtual persona models comprising a voice synthesis module to generate customized commentary comprising original content;
based at least in part on processing the information relating to the at least one event, determine a period of time associated with an occurrence of the at least one event;
based at least in part on determining that the period of time is less than or equal to a threshold period of time:
refrain from inserting an advertisement into the customized commentary; and
insert into the customized commentary one or more anecdotes relating to the at least one event; and
output the customized commentary comprising the original content and the one or more anecdotes.

12. The system of claim 11, wherein the voice synthesis module generates the customized commentary comprising at least one of: a voice, a tone, and pronunciation corresponding to a persona on which the selected virtual persona model is based.

13. The system of claim 11, wherein the selected virtual persona model further comprises a personality module configured to generate the customized commentary corresponding to at least one of: a delivery style, vocabulary, and grammar of a persona on which the selected virtual persona model is based.

14. The system of claim 11, wherein the control circuitry is configured to determine the selected virtual persona model by receiving a user-interface selection from a user or from a broadcaster.

15. The system of claim 11, wherein the information relating to the at least one event is processed to generate an incident script comprising at least one currently occurring incident corresponding to the at least one event described using vocabulary corresponding to the competition activity.

16. The system of claim 11, wherein the information relating to the at least one event occurring during the competition activity comprises at least one of: a current action, a predicted action, a predicted tactic, a predicted outcome, a time to a subsequent action, a predicted urgency factor.

17. The system of claim 11, wherein the information relating to the at least one event is processed to determine whether ancillary information related to or unrelated to the competition activity is to be incorporated into the customized commentary, and where it is determined that the ancillary information is to be incorporated, incorporating the ancillary information; and optionally, wherein the ancillary information comprises at least one of: information relating to the competition activity or another competition activity, information relating to a participant of the competition activity, information relating to current events, information relating to interests of a user, and information relating to the advertisement.

18. The system of claim 11, wherein the customized commentary is produced to incorporate commentary which is reactionary to a secondary customized commentary, wherein the secondary customized commentary is generated using a second virtual persona model.

19. The system of claim 11, wherein the control circuitry is further configured to process the information relating to the at least one event occurring during the competition activity to produce secondary customized commentary generated using a second virtual persona model, wherein the customized commentary and the secondary customized commentary relate to different events.

20. The system of claim 11, wherein the control circuitry is further configured to determine if a question has been received from a user, and where the question has been received from the user, incorporating a response to the question in the customized commentary.

* * * * *